United States Patent
Oakley et al.

(10) Patent No.: US 11,909,723 B2
(45) Date of Patent: Feb. 20, 2024

(54) MOBILE VPN AUTOSTART THROUGH APP-ONLY MANAGEMENT

(71) Applicant: Microsoft Technology Licensing, LLC, Redmond, WA (US)

(72) Inventors: James Matthew Hamilton Oakley, Holliston, MA (US); Neil Adam Jacobson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 17/348,541

(22) Filed: Jun. 15, 2021

(65) Prior Publication Data

US 2022/0400100 A1 Dec. 15, 2022

(51) Int. Cl.
*H04L 9/40* (2022.01)
*H04L 41/22* (2022.01)

(52) U.S. Cl.
CPC .......... *H04L 63/0272* (2013.01); *H04L 41/22* (2013.01); *H04L 63/029* (2013.01); *H04L 63/0245* (2013.01); *H04L 63/20* (2013.01)

(58) Field of Classification Search
CPC ............. H04L 63/0245; H04L 63/0272; H04L 63/029; H04L 63/20; H04L 63/10; G06F 21/604; H04W 12/08; H04W 12/30; H04W 12/37
USPC ......................................................... 726/15
See application file for complete search history.

(56) References Cited

U.S. PATENT DOCUMENTS

| | | | | |
|---|---|---|---|---|
| 8,904,477 B2* | 12/2014 | Barton | ................ | G06F 21/6218 726/1 |
| 9,948,612 B1* | 4/2018 | Jawahar | .............. | H04L 63/0272 |
| 10,761,863 B2 | 9/2020 | Walker | | |
| 2012/0311659 A1* | 12/2012 | Narain | .................. | H04W 12/37 726/1 |
| 2014/0032758 A1* | 1/2014 | Barton | .................... | H04L 41/00 709/225 |
| 2014/0033271 A1* | 1/2014 | Barton | .................. | H04W 12/64 726/1 |
| 2014/0040979 A1* | 2/2014 | Barton | .................. | H04W 12/30 726/1 |
| 2014/0096186 A1* | 4/2014 | Barton | ................ | G06F 21/6218 726/1 |
| 2014/0109175 A1* | 4/2014 | Barton | ................ | H04L 63/0807 726/1 |

(Continued)

OTHER PUBLICATIONS

"BlackBerry Uem", Retrieved from: https://docs.blackberry.com/content/dam/docs-blackberry-com/release-pdfs/en/blackberry-uem/12_12/administration/Securing-network-connections-BlackBerry-UEM-12.12-en.pdf, Mar. 23, 2020, 94 Pages.

(Continued)

*Primary Examiner* — Samson B Lemma
(74) *Attorney, Agent, or Firm* — Workman Nydegger

(57) ABSTRACT

Techniques for auto-starting a VPN in a MAM environment are disclosed. A MAM-controlled application is launched on a computer system. Policy is queried and a determination is made as to whether to auto-start a VPN application based on the policy. Based on the policy, the VPN application is auto-started, and the VPN application initiates a VPN tunnel that is usable by at least the MAM-controlled application. Network communications transmitted to or from the MAM-controlled application then pass through the VPN tunnel.

20 Claims, 11 Drawing Sheets

(56) References Cited

U.S. PATENT DOCUMENTS

| | | | | |
|---|---|---|---|---|
| 2016/0197909 A1* | 7/2016 | Innes | .................... | H04W 12/06 |
| | | | | 726/6 |
| 2016/0337104 A1* | 11/2016 | Kalligudd | ........... | H04L 12/4641 |
| 2017/0310445 A1* | 10/2017 | Kalligudd | ........... | H04L 61/4511 |
| 2019/0057088 A1* | 2/2019 | Chander | ............... | G06F 16/907 |
| 2020/0104144 A1* | 4/2020 | Walker | ................ | G06F 3/04842 |
| 2020/0104145 A1* | 4/2020 | Walker | ...................... | G06F 8/30 |

OTHER PUBLICATIONS

"Configure a Per-App VPN Configuration for iOS Endpoints Using AirWatch", Retrieved from: https://docs.paloaltonetworks.com/globalprotect/9-1/globalprotect-admin/mobile-endpoint-management/set-up-a-mobile-endpoint-, management-system/manage-the-globalprotect-app-using-a-third-party-mdm/per-app-vpn-configurations/configure-a-per-app-vpn-configuration-using-airwatch/configure-a-per-app-vpn-configuration-for-ios-endpoints-using-airwatch, Retrieved Date: Apr. 22, 2021, 11 Pages.

"Enterprise VPN Solutions and Services", Retrieved from: https://web.archive.org/web/20200927010315/https://www.perimeter81.com/resources/enterprise-vpn-solution, Sep. 27, 2020, 27 Pages.

"Set up managed configurations bookmark_border", Retrieved from: https://web.archive.org/web/20210516115455/https://developer.android.com/work/managed-configurations, May 16, 2021, 6 pages.

Araujo, Ken, "Application-layer VPNs guard access", Retrieved from: https://www.networkworld.com/article/2340697/application-layer-vpns-guard-access.html, Mar. 17, 2003, 5 Pages.

Ohlinger, et al., "Android Enterprise device settings to configure VPN in Intune", Retrieved from: https://docs.microsoft.com/en-us/mem/intune/configuration/vpn-settings-android-enterprise, Mar. 2, 2021, 6 pages.

Reitan, et al., "Use a VPN and per-app VPN policy on Android Enterprise devices in Microsoft Intune", Retrieved from: https://docs.microsoft.com/en-us/mem/intune/apps/app-configuration-vpn-ae, Mar. 25, 2021, 13 Pages.

Stalhood, Carl, "App Layering—Enterprise Layer Manager (ELM) 2104", Retrieved from: https://www.carlstalhood.com/app-layering-enterprise-layer-managed, Apr. 15, 2021, 58 Pages.

"International Search Report and Written Opinion Issued in PCT Application No. PCT/US22/029733", dated Jul. 28, 2022, 11 Pages.

* cited by examiner

US 11,909,723 B2

MOBILE VPN AUTOSTART THROUGH APP-ONLY MANAGEMENT

BACKGROUND

A "virtual private network" (VPN) is a type of service that protects communications transmitted over a network connection. In particular, a VPN provides an encrypted tunnel through which data packets can travel from one point to another. When a VPN is used by a client device to connect to an endpoint via the Internet, that VPN connection helps protect a user's data, thereby allowing the user to interact with data in a private and secure manner. A VPN can also be used to hide a user's IP address and even to hide the user's physical address. Additionally, by encrypting data packets transmitted through the VPN, those data packets are protected from potentially malicious actors. As such, many business enterprises desire users to use VPNs, especially when those users are interacting with the enterprise's data. What is needed, therefore, is an improved technique for utilizing VPNs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods for auto-starting a virtual private network (VPN) in a mobile application management (MAM) environment operating on a computer system.

Some embodiments determine that a MAM-controlled application is launching on the computer system. After determining that the MAM-controlled application is launching, the embodiments query a policy and determine whether to auto-start a VPN application based on the policy. Based on the policy indicating that the VPN application is to be auto-started after or concurrently with a launch of the MAM-controlled application, the embodiments auto-start the VPN application, which is configured to initiate a VPN tunnel that is usable by at least the MAM-controlled application. The embodiments also cause network communications transmitted to or from the MAM-controlled application to pass through the VPN tunnel. Optionally, some embodiments cause the VPN application to terminate the VPN tunnel at some time after the application was auto-started.

Some embodiments determine that a MAM-controlled application is launching on the computer system. After determining that the MAM-controlled application is launching, the embodiments query a policy and determine that the policy indicates that a VPN application is to automatically initiate a VPN tunnel after or while a user interface (UI) of the MAM-controlled application is being brought to a foreground of the computer system. In response to an indication that the UI of the MAM-controlled application is currently or will subsequently be brought to the foreground, the embodiments cause the VPN application to initiate the VPN tunnel, which is usable by at least the MAM-controlled application. Additionally, the embodiments cause network communications transmitted to or from the MAM-controlled application to pass through the VPN tunnel provided by the VPN application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
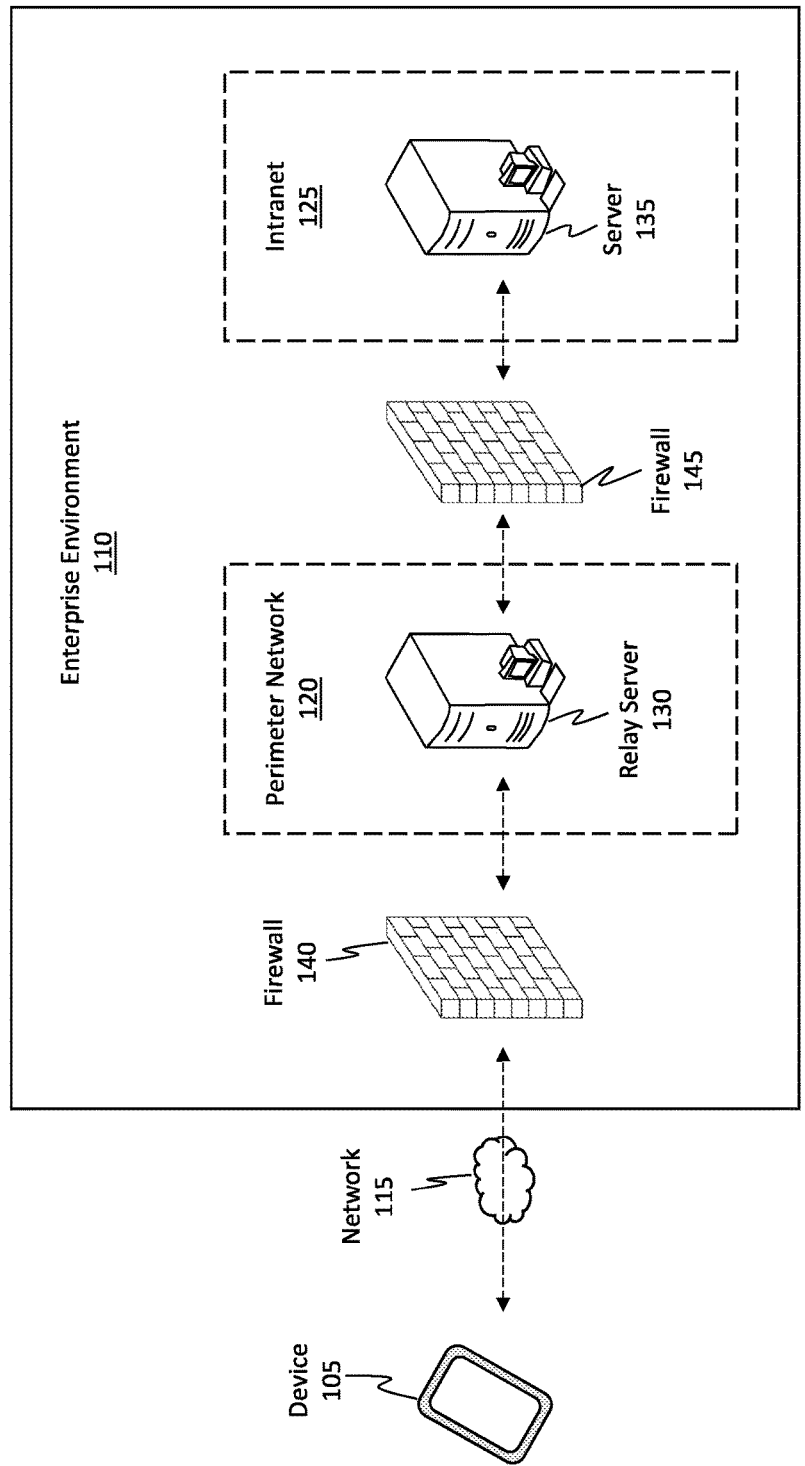
FIG. 1 illustrates an example of a "bring your own device" (BYOD) architecture.

Embodiments disclosed herein relate to systems, devices (e.g., wearable devices, hardware storage devices, etc.), and methods for auto-starting a virtual private network (VPN) in a mobile application management (MAM) environment that is operating on a computer system. As used herein, the term "launch" can refer to a scenario in which either an application has begun operating or, optionally, a particular component of an application has begun operating, such as in the case where a user interface (UI) is being brought to a foreground on a client device or in the case where a VPN has begun operating. "Launch" can also refer to a scenario in which an application is resuming foreground operations when it was previously in a paused or background state, such as where an application UI was in the background but is now being brought to a foreground (e.g., perhaps a user navigated away from the application without the application terminating, and the user is now returning to the application). The term "auto-start" (and its variants) refers to a scenario where a VPN application is automatically (i.e. without user input) started (i.e. launched) and automatically triggered to establish a VPN tunnel for connection by the MAM-controlled application, where the automatic start is facilitated by the policy. By "auto-starting" a VPN application, the user does not manually launch the VPN application; furthermore, the VPN application may not need to display a foreground UI to the user. Instead, the VPN application can be auto-started and can run in the background.

Some embodiments determine that a MAM-controlled application is launching on the computer system. After determining that the MAM-controlled application is launching, the embodiments query a policy and determine whether to auto-start a VPN application based on the policy. Based on the policy indicating that the VPN application is to be auto-started after or concurrently with a launch of the MAM-controlled application, the embodiments auto-start the VPN application, which is configured to initiate a VPN tunnel that is usable by at least the MAM-controlled application. The embodiments also cause network communications transmitted to or from the MAM-controlled application to pass through the VPN tunnel. Optionally, some embodiments cause the VPN application to terminate the VPN tunnel.

Some embodiments determine that a MAM-controlled application is launching on the computer system. After determining that the MAM-controlled application is launching, the embodiments query a policy and determine that the policy indicates that the VPN application is to automatically initiate the VPN tunnel after or while a user interface (UI) of the MAM-controlled application is being brought to a foreground of the computer system. In response to an indication that the UI of the MAM-controlled application is currently or will subsequently be brought to the foreground, the embodiments cause the VPN application to initiate the VPN tunnel, which is usable by at least the MAM-controlled application. Additionally, the embodiments cause network communications transmitted to or from the MAM-controlled application to pass through the VPN tunnel provided by the VPN application.

Examples of Technical Benefits, Improvements, And Practical Applications

The following section outlines some example improvements and practical applications provided by the disclosed embodiments. It will be appreciated, however, that these are just examples only and that the embodiments are not limited to only these improvements.

The disclosed embodiments bring about numerous and substantial benefits to the technical field. For example, by enabling a VPN to be automatically started in a MAM environment, the embodiments directly and significantly improve the user's experience with the client device hosting the MAM environment. To illustrate, by following the disclosed principles, users are no longer required to manually start a VPN. Furthermore, users and IT administrator can be confident that the VPN is protecting enterprise data. In this sense, the automatically-started VPN provides enhanced data protection to enterprise data.

The embodiments also improve the underlying operations of the computer system. As an example, the embodiments are able to automatically and intelligently start and stop when a VPN is being used. Through this intelligence, the embodiments help maximize or at least improve the device's battery longevity as a result of the VPN being used when needed as opposed to always being on. In a similar manner, the embodiments improve memory usage as a result of their ability to intelligently turn on and off the VPN. These and numerous other benefits will now be described in detail throughout the remaining portions of this disclosure.

BYOD Architecture

Attention will now be directed to FIG. 1, which illustrates an example of a "bring your own device" BYOD architecture 100. For example, the BYOD architecture 100 includes a client device 105, such as an employee's own personal device (e.g., a smart phone, tablet, laptop, etc.), and an enterprise environment 110 (e.g., a network infrastructure of an enterprise organization). The device 105 can connect to the enterprise environment 110 via any type of network 115, such as the Internet, a local area network (LAN), or some other type of wide area network (WAN).

In FIG. 1, the enterprise environment 110 is shown as including a perimeter network 120 and an intranet 125. The perimeter network 120 can include any number of servers, such as relay server 130. The relay server 130 can potentially be used to select an internal server in order to receive and process requests, similar to a load balancer. The intranet 125 is shown as including any number of servers, such as server 135. For instance, a request can be received by the relay server 130. The relay server 130 can then determine which server in the intranet 125 portion of the enterprise environment 110 is available to process and handle the request.

In some cases, a firewall 140 can be logically positioned at a front end of the enterprise environment 110 in order to protect the enterprise environment 110 from various types of incoming traffic. Similarly, an intervening firewall 145 can be positioned between the perimeter network 120 and the intranet 125 so as to provide additional protections for the internal servers in the intranet 125.

With this architecture, enterprises can allow users/employees to use their own personal devices to work on business-related matters. Because of the convenience employees experience as a result of being able to use their own devices, there is a growing trend towards BYOD architectures. There is also a growing desire on the part of enterprise organizations to ensure that their data is safeguarded when used by an employee's personal device. Various constructs have been developed in order to provide those safeguards. Such constructs include a MDM environment and a MAM environment, as described in more detail below.

MDM And MAM Environments

As indicated above, there are different techniques to safeguard and control enterprise data in a BYOD architecture. One such technique is referred to as "Mobile Device Management," or "MDM," while another technique is referred to a "Mobile Application Management," or "MAM." FIG. 2 shows the differences between these two techniques.

Figure 2:
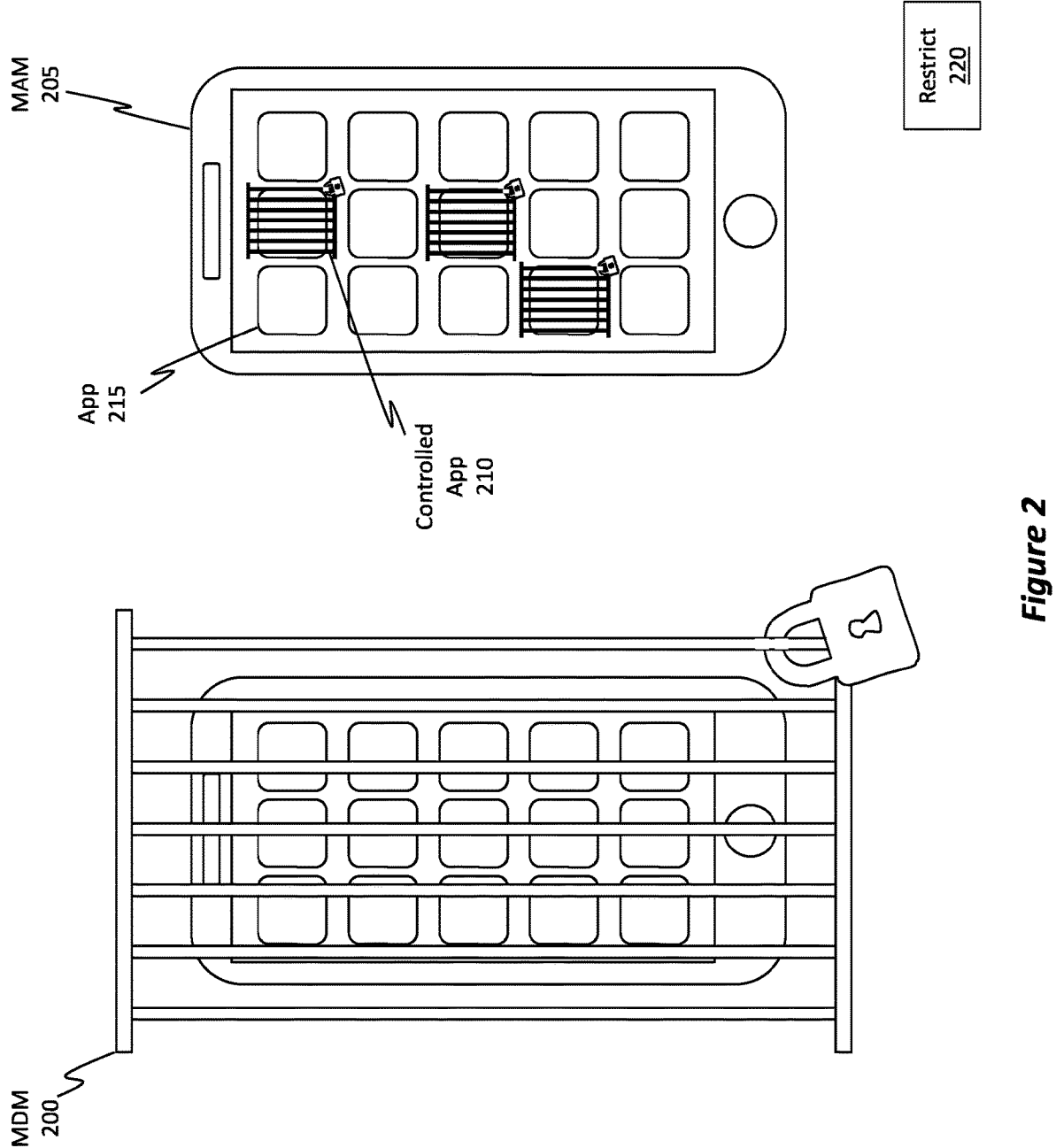
FIG. 2 illustrates the differences between a mobile device management (MDM) environment and a mobile application management (MAM) environment.

FIG. 2 shows a device controlled by MDM 200 and a device controlled by MAM 205. Generally, MDM 200 is an administration technique used by enterprises to control a user's device. The user device is often configured to include various on-device applications and/or configurations, policies, tokens, backend infrastructure, and/or certificates designed to allow the enterprise (e.g., the IT department) to control the user's device in a specific manner, such as by limiting what the device can do with an enterprise's data or access. MDM 200 allows policy to be implemented at the device by over-the-air distribution of data, applications, configurations, and so forth. Generally, MDM 200 has control over the entire device, as shown in FIG. 2 by the "jail bars" covering the entire device. In this regard, MDM 200 allows an enterprise's IT administrators to control, secure, and enforce policies on a user's device.

With MDM 200, it is often the case that a client agent is installed on the user's device. The enterprise system includes a server and a server agent. The policies are configured through the server agent, which then pushes or transmits the policies to the agent on the device. The agent is configured to implement the policies by communicating with various application programming interfaces (APIs) and the operating system (OS) of the device. The agent then controls the entire device.

MAM 205, on the other hand, focuses on a more granular or refined control. That is, in contrast to MDM 200, which effectively controls the entire device, MAM 205 controls specific applications installed on the device. That is, each application can include an embedded MAM component, which then implements policy and operates to control that specific application.

As an example, the MAM 205 may control the controlled app 210 (e.g., perhaps an email application used to access enterprise data) but may not control the app 215, which could be a gaming application installed on the user's device. The controlled app 210 may have an embedded MAM component used to implement the enterprise policy while the app 215 may not have an embedded MAM component.

In this sense, MAM 205 can be used to control specific software or applications installed on a user's device but not the entire device. Furthermore, a MAM environment operates to restrict 220 MAM-controlled applications (e.g., controlled app 210) but refrains from restricting other applications (e.g., the app 215) installed on the client device.

Virtual Private Networks

Figure 3:
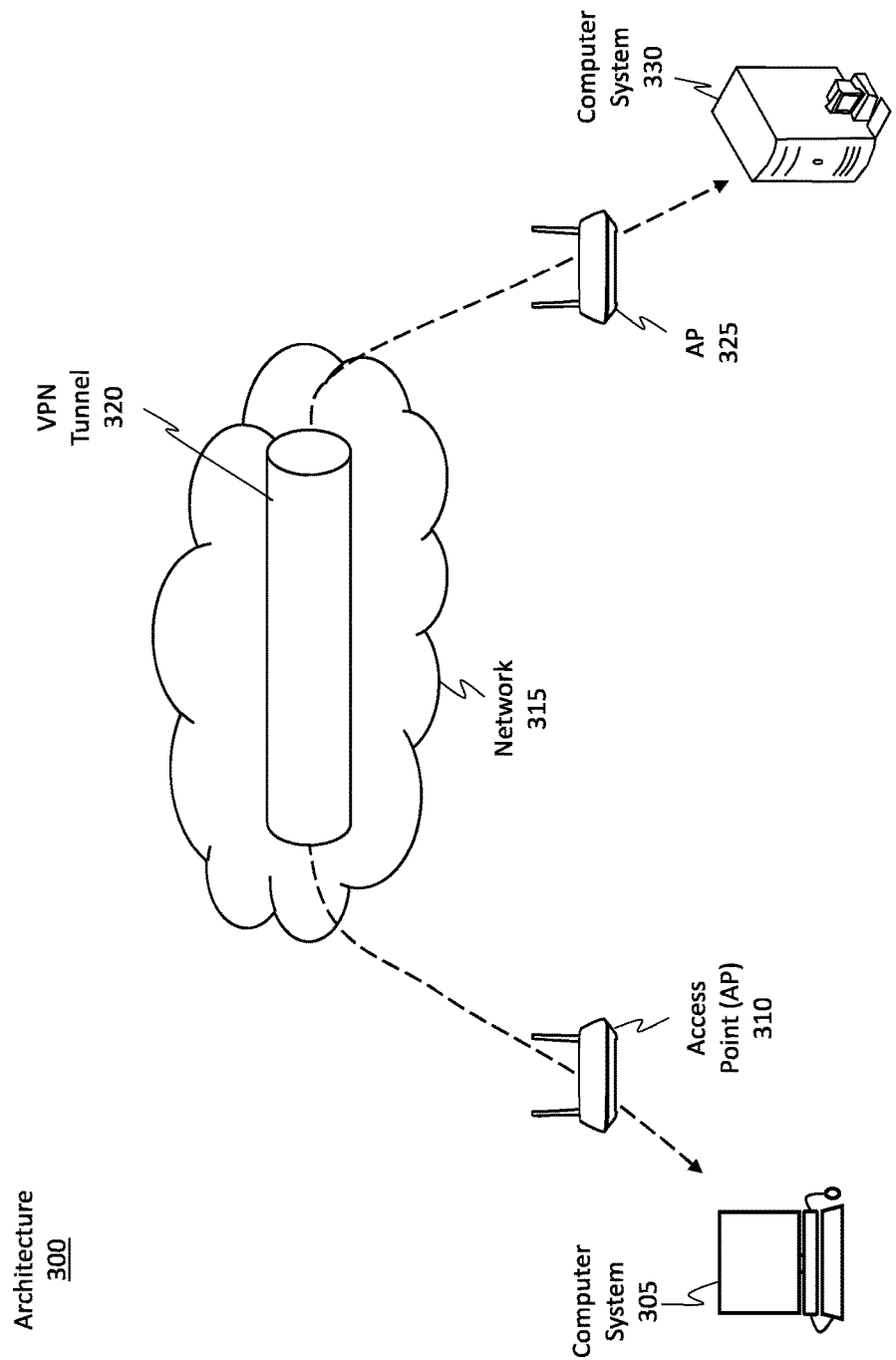
FIG. 3 illustrates the use of a virtual private network (VPN), which can be used to connect one device or endpoint to another device or endpoint.

It is often the case that enterprises desire users to utilize a virtual private network (VPN) when interacting with enterprise data. That is, regardless of whether a MDM environment or an MAM environment is installed on the user's device, it is often the case that enterprises desire the use of a VPN. Generally, a VPN establishes a private network (e.g., a tunnel) across a public network. The VPN allows users to send and receive data using this VPN tunnel in a manner as if those users' devices were directly connected to a specific endpoint as opposed to being connected via a public network (e.g., the Internet). FIG. 3 is illustrative.

FIG. 3 shows an example architecture 300 that includes a computer system 305 (e.g., perhaps a client device, such as those shown in FIG. 2) and an access point (AP) 310 (e.g., perhaps a router). The architecture 300 also includes a network 315, such as perhaps the public Internet or some other WAN. The embodiments are able to initiate a VPN tunnel 320 via the network to enable the computer system 305 to connect with another AP 325 and a computer system 330, such as perhaps an enterprise server. The VPN tunnel 320 provides a secure avenue by which data packets can be transmitted between the two computer systems 305, 330.

Figure 4:
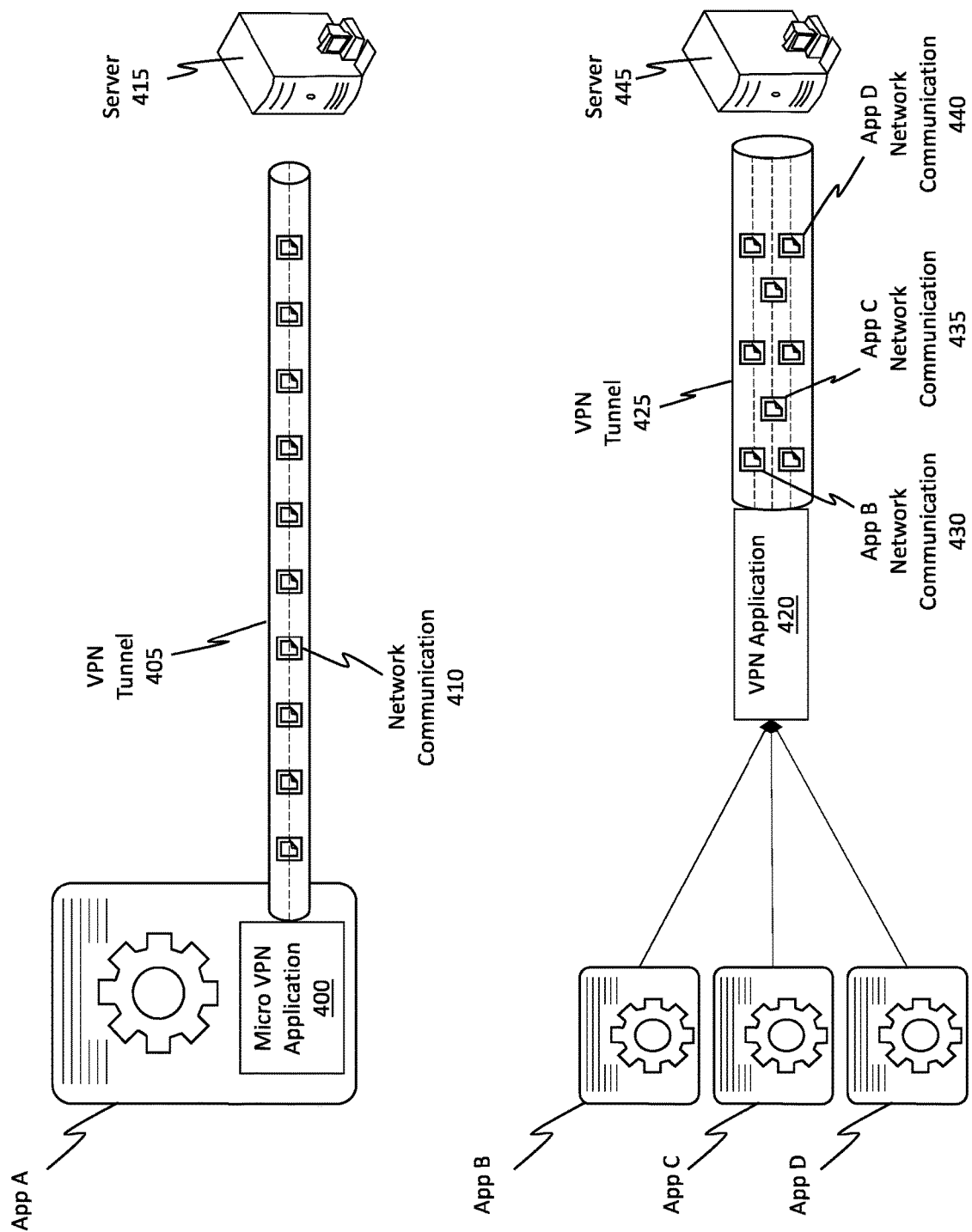
FIG. 4 illustrates the differences between a "micro VPN application" and a "VPN application."

FIG. 4 shows some different implementations of VPNs. In one case, an App A can include a so-called Micro VPN Application 400, which is configured to initiate a VPN tunnel 405 to enable network communications (e.g., network communication 410) to be transmitted to or from only the App A to a server 415. Notice, the micro VPN application 400 is an embedded component or part of the App A.

Notably, the micro VPN application 400 is restricted to passing communications only for the App A and not for any other applications. That is, if the device included an App B, App B would not be able to use the VPN tunnel 405 provided by the micro VPN application 400. Instead, App B would have to use a different VPN tunnel. Therefore, as used herein, the phrase "micro VPN application" refers to a VPN providing service that provides a dedicated VPN tunnel for only a single application, such as App A.

In another case, a VPN application 420 (which is distinct from a "micro VPN application") can be provided to enable multiple different applications to use the same VPN tunnel 425. Notice, VPN application 420 is an independent application and is not necessarily an embedded part or component of an underlying application.

FIG. 4 shows three different applications (App B, App C, and App D), each of which is using the same VPN tunnel 425 to send and receive communications. To illustrate, App B is sending or receiving App B network communication 430; App C is sending or receiving App C network communication 435; and App D is sending or receiving App D network communication 440 to the server 445. Therefore, in contrast with the VPN tunnel 405 provided by the micro VPN application 400, the VPN tunnel 425 provided by the VPN application 420 can be used by multiple different applications and is not dedicated to only a single application.

Because MDM has control over the entire device, the ability to automatically start, launch, trigger, or initiate a VPN application has been traditionally available in MDM environments. For instance, the MDM can monitor when an application launches. The MDM can consult policy to determine whether a VPN should be used for that application. Based on the policy, the MDM can then automatically initiate the VPN for use by the application. Such operations are available because MDM generally has control over the entire device, including all applications on that device. In some cases, the MDM agent might not actually monitor application launches; rather, the MDM agent can just use OS-provided APIs (e.g., APIs available only to an agent with full-device MDM permissions) to configure the OS with such commands as "keep the VPN running all the time" or "start the VPN automatically when this application launches." The process of fulfilling those commands can then be done at the OS level.

That was not the case, however, in MAM environments. Recall, in a MAM environment, control is exercised at a lower-privileged app-only level. Although MAM has the ability to control the operations of specific applications, it was traditionally the case that MAM could not "reach out" and control other applications (e.g., a VPN application) in the manner that MDM could control those applications. Therefore, traditional MAM systems did not include the ability to automatically start a VPN application in response to another application launching.

Figure 5:
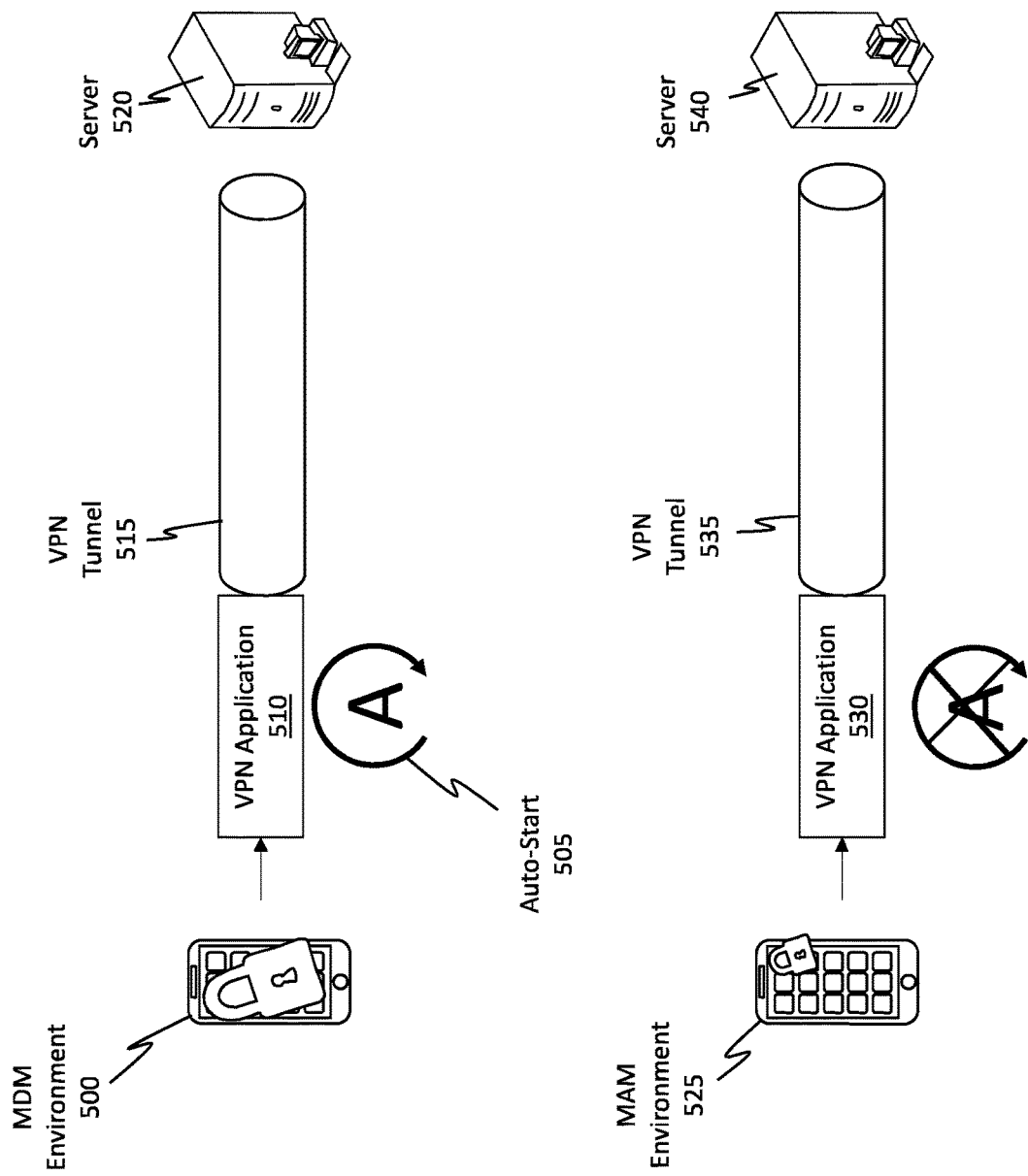
FIG. 5 illustrates how, traditionally, VPN applications could be automatically triggered in a MDM environment; however, traditionally, VPN applications could not be automatically triggered or started in a MAM environment.

It should also be noted how micro VPN applications could traditionally be automatically started in either a MDM environment or a MAM environment. That was the case because a micro VPN application is an embedded part or component of an application. When the underlying application starts, so too does the micro VPN application, regardless of whether the application is MDM controlled or MAM controlled. As reflected earlier, this disclosure makes clear that "micro VPN applications" are distinct from "VPN applications." Accordingly, VPN applications could not traditionally be automatically started, launched, triggered, or initiated in a MAM environment. FIG. 5 provides further details.

FIG. 5 shows two scenarios, one involving a traditional MDM environment and one involving a traditional MAM environment. Specifically, FIG. 5 shows a device with an MDM environment 500. Because the MDM environment 500 can control the entire device (including any applications installed on that device), the MDM environment 500 was able to auto-start 505 a VPN application 510, which could then initiate a VPN tunnel 515 with a server 520. For instance, when the device was being used to interact with enterprise data, the MDM environment 500 could automatically trigger or start the VPN application 510.

Traditionally, that was not the case for the MAM environment 525. That is, although a client-side MAM agent embedded in an application could control that specific application, the MAM agent did not have the ability to control or even trigger the launching of another application, such as VPN application 530; instead, a user would traditionally have to manually trigger or start the VPN application 530, which would then initiate the VPN tunnel 535 to the server 540. With these traditional techniques, users were required to perform additional work, thereby increasing frustration and burden on the part of the user. Additionally, IT administrators were often frustrated and concerned that users might not secure enterprise data as a result of not using a VPN. What is needed, therefore, is an improved technique for automatically starting, triggering, launching, or initiating a VPN application in a MAM environment, so that VPN application can then provide a VPN tunnel for one or potentially more than one MAM-controlled application.

Stated differently, popular mobile device platforms provide the ability for one application to establish a VPN connection that (after end user consent) will be used to tunnel traffic from other applications on the device. When MDM is in use, the administrator of the MDM solution may configure the device to start the VPN application automatically. In contrast, when MAM is solely in use, without device management, no such auto-start configuration has traditionally been available from the device platform. Nonetheless, administrators of MAM deployments desire the ability to automatically start the VPN application when managed applications are in use.

Auto-Starting VPN Application in A MAM Environment

In accordance with the disclosed principles, a software library can be embedded in a MAM-controlled or MAM-managed application, and that library can be configured to automatically start (i.e. "auto-start") an independent and external (relative to the MAM-controlled application) VPN application (i.e. not a micro VPN application) based on certain administrator configuration settings or "policy," without explicit action by either the device platform or even the MAM-controlled application logic. For example, a MAM-controlled application can have embedded therein a software library, or software development kit "SDK," which may have been created by a MAM vendor. The SDK can be configured to use standard mechanisms provided by the device platform (e.g., the operating system) to run code when the MAM-controlled application is launched.

When the MAM-controlled application is launched, the SDK code is also launched (as a result of being embedded in the MAM-controlled application), and the SDK code consults certain administrator-provided policy, which can be cached locally or which can potentially be retrieved over the Internet in a standard manner. If instructed by the policy, the SDK can then trigger the launch of a VPN application, which can then generate a VPN tunnel. Triggering the launch of the VPN application can be performed by the SDK sending a message, which is sent using a standard platform-provided IPC mechanisms (e.g., an Intent on the Android platform), to the device's OS.

Upon receipt of this message, the VPN application can then establish a connection to an associated remote server and can then configure a VPN tunnel interface using the platform's prescribed manner. Network traffic from the MAM-controlled application can then flow through the VPN tunnel without the human user having to manually launch the VPN application and without the developer of the MAM-controlled application having to write code to do so. With that introduction, attention will now be directed to FIG. 6.

Figure 6:
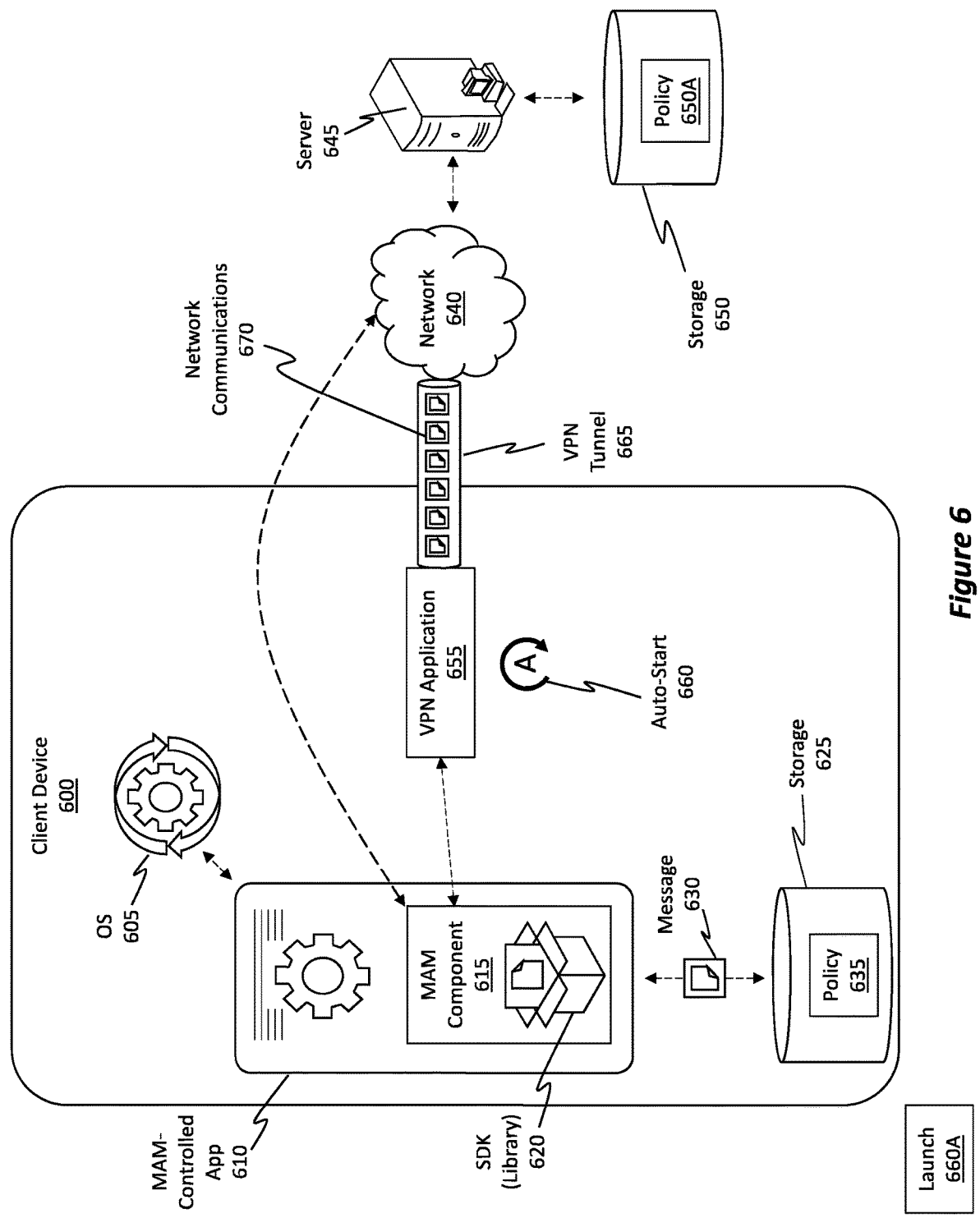
FIG. 6 illustrates an example implementation in which a VPN application is automatically triggered in a MAM environment in accordance with the disclosed principles.

FIG. 6 shows one example implementation for automatically starting a VPN application in a MAM environment. In particular, FIG. 6 shows a client device 600, which is representative of the client devices described thus far. Client device 600 includes an operating system (OS) 605 and a MAM-controlled app 610, such as the controlled app 210 from FIG. 2.

In some example scenarios, the MAM-controlled app 610 is configured to include a MAM component 615, which is used to control the operations of the MAM-controlled app 610 as discussed previously (e.g., implementing enterprise policy). The MAM component 615 can be equipped or configured to include a software development kit SDK (aka library) 620. In some cases, the MAM component 615 and the SDK 620 are the same. Accordingly, in some embodiments, the MAM-controlled app 610 includes a MAM component 615 that limits or restricts operations of the MAM-controlled application based on enterprise policy in accordance with MAM principles. As an example of such restriction, the policy may require that the MAM-controlled application use only a VPN when interacting with enterprise data. As another example of a restriction, the policy may require that the MAM-controlled application require a certain level of authentication for a user.

As discussed previously, policy is used to control the operations of the MAM-controlled app 610. The SDK 620 can be configured to acquire and implement that policy, including policy dictating that a VPN tunnel should be used.

In one example technique, the SDK 620 can communicate with storage 625 of the client device 600 via a message 630. The storage 625 can cache or otherwise store policy 635, which may have been received at the client device 600 at some previous time. In this sense, the SDK 620 can query a local storage repository in order to acquire the policy 635.

In another example, the SDK 620 can communicate over a network 640 with a server 645 to order to obtain access to remote storage 650, which can retain the policy 650A. In this sense, the SDK 620 can obtain the policy 650A from a remote location.

Regardless of how the SDK 620 obtains the policy 635, 650A, the SDK 620 uses that policy to perform a number of operations. For example, the policy can dictate whether a VPN tunnel should be initiated when the MAM-controlled app 610 is in use or perhaps when a user interface (UI) of the MAM-controlled app 610 is brought to a foreground of the client device 600. Indeed, the policy can dictate that a VPN tunnel should be initiated based on any number of specified conditions or criteria, as will be described in more detail later.

Because the SDK 620 is a part of the MAM-controlled app 610 (i.e. the SDK 620 is embedded in the MAM-controlled app 610), the SDK 620 will launch when the MAM-controlled app 610 launches. The SDK 620 can then communicate with the OS 605 to determine the various states of the MAM-controlled app 610, such as perhaps when a UI of the MAM-controlled app 610 will surface (i.e. is brought to a foreground of the client device's display).

Because the SDK 620 now has the policy, which can delineate whether or not a VPN application 655 is to be launched based on various criteria (e.g., perhaps a UI being brought to a foreground), the SDK 620 can trigger the auto-start 660 (aka launch 660A) of the VPN application 655 when the criteria or conditions are satisfied or will be satisfied within a predetermined upcoming time period. Further details on this auto-start will be provided later.

The policy can specify any type of condition or criteria in order to trigger the auto-start of a VPN application. As indicated above, one example condition can be when a UI of the MAM-controlled application is brought to a foreground. Another example condition can include a scenario where the MAM-controlled application is sending or receiving network communications. Another example condition can include a scenario where the client device has a Wi-Fi feature turned on. Accordingly, the policy can specify any type of condition or criteria. When that condition or criteria is satisfied, then the SDK can automatically start the VPN application.

The SDK 620 is able to cause the VPN application 655 to auto-start 660 so the VPN application 655 can then initiate a VPN tunnel 665 though which network communications 670 from or to the MAM-controlled app 610 can pass, potentially to the server 645. The process of automatically triggering the VPN application 655, which then initiates the VPN tunnel 665, can be performed using a standard platform-provided inter-process communication (IPC), such as by communicating with the OS 605 or potentially by intercepting communications associated with the OS 605. Additionally, the VPN tunnel 665 can be used by other MAM-controlled applications executing on the client device 600.

In this regard, even though the client device 600 is hosting or includes a MAM environment, a VPN application 655 can automatically be triggered or started as a result of the SDK 620 implementing policy. Stated differently, the VPN application 655 initiates the VPN tunnel 665 independently of logic that is executed to operate the MAM-controlled app 610. That is, once the VPN application 655 is triggered via the SDK 620, the VPN application 655 can operate independently of the SDK 620 to initiate the VPN tunnel 665. Again, further details on this auto-starting process will be provided shortly.

Accordingly, in some embodiments, a library (e.g., the SDK) integrated with the MAM-controlled application can be configured to communicate with an operating system of the client device. This library can determine, based on communications with the operating system, when a user interface (UI) of the MAM-controlled application will subsequently be brought to a foreground of the client device or when some other specified condition occurs. To do so, the library can interact with the OS to determine when the UI will surface, is currently surfacing, or has already surfaced. The library triggers the VPN application to initiate the VPN tunnel in response to (i) a determination that the UI will subsequently be brought to the foreground within a determined time period, (ii) a determination that the UI is currently being brought to the foreground, or (iii) a determination that the UI has already by brought to the foreground. If the UI has already been brought to the foreground, then the library can be configured to trigger the VPN application within a determined time period after the UI has surfaced (i.e. brought to the foreground). That time period can be set to any time period.

Previously, there was mention of a micro VPN application. Traditionally, a micro VPN application could be auto-started when that micro VPN application's underlying application (i.e. the application in which the micro VPN application was embedded) was launched. Notably, however, micro VPN applications (or simply "micro VPNs") are often less desirable due to the need to embed the VPN protocol and network interception logic into that underlying application and due to the lack of shared connection between multiple applications. The disclosed embodiments, on the other hand, can auto-start a VPN application, which is configured to host multiple connections for multiple different applications.

In this regard, a VPN application can use the platform VPN framework and can be used with or without device management. Furthermore, using the VPN application avoids the downsides of using a micro VPN. Accordingly, the disclosed embodiments are able to automatically start a VPN application in a MAM environment. Such principles are distinct from automatically starting a micro VPN (in either a MDM environment or a MAM environment) and are distinct from automatically starting a VPN application in a MDM environment. In this sense, the disclosed principles provide an application-layer manager (i.e. the SDK) that can utilize native operating system and platform VPN functionalities to auto-start and manage a shared VPN tunnel. The VPN application that initiates the shared VPN tunnel can be triggered or initiated automatically based on enterprise policy. Furthermore, the VPN application can enable multiple MAM-controlled applications to use the same VPN tunnel. Furthermore, if the VPN application is already running, the management layer does not actually have to do anything to connect a second MAM-controlled application to the VPN tunnel. Instead, that connection can happen automatically through OS mechanisms by virtue of the fact that the VPN application is a dedicated VPN application that uses platform mechanisms to tell the OS that it is providing VPN functionalities.

Figure 7:
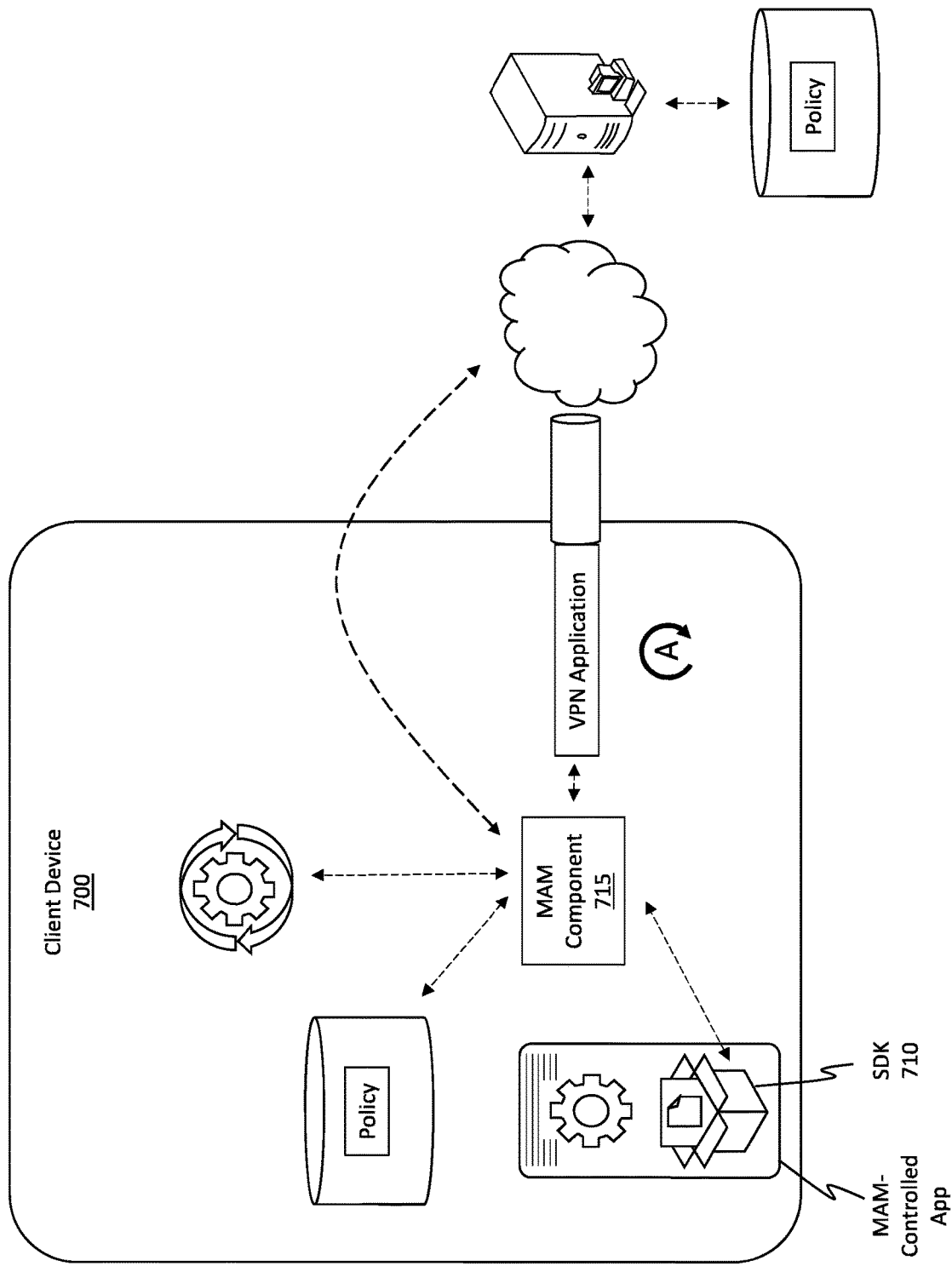
FIG. 7 illustrates another scenario in which a VPN application is automatically started in a MAM environment.

FIG. 7 shows another scenario in which policy can be obtained to determine when and how a VPN application is to be automatically started in a MAM environment. Specifically, FIG. 7 shows a client device 700, a MAM-controlled app 705, and a SDK 710 included as a part of the MAM-controlled app 705. Whereas in FIG. 6 the MAM component 615 was a part of the MAM-controlled app 610, FIG. 7 shows a scenario where the MAM component 715 is not a part of the MAM-controlled app 705 but rather is an independent component operating on the client device 700. In this scenario, the MAM component 715 can operate as a central control component on the client device 700 and can potentially control multiple MAM-controlled apps, whereas the MAM component 615 of FIG. 6 controlled only the one MAM-controlled app 610. That being said, the MAM component 715 still does not have complete control over the client device 700; instead, the MAM component 715 has limited control in that it can control only specified applications. Accordingly, in some embodiments, the client device includes a MAM component that limits or restricts operations of the MAM-controlled application.

Figure 8:
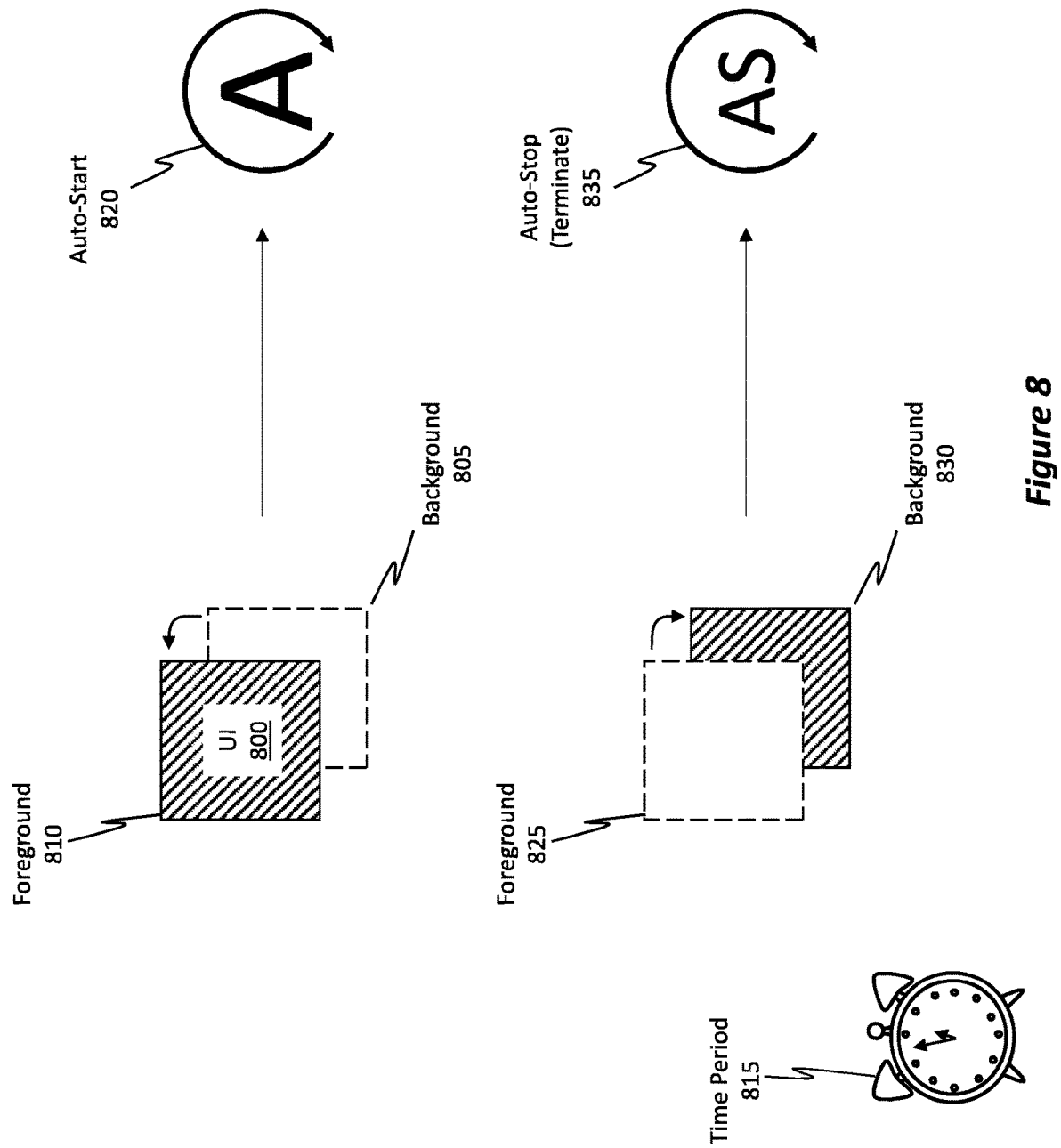
FIG. 8 illustrates an example condition that can trigger the automatic start of a VPN application.

The SDK mentioned earlier is configured to communicate with the OS to determine when a UI of the MAM-controlled application is about to surface or be brought to a foreground. The SDK can also determine whether the UI has already been brought to the foreground or is currently being brought to the foreground. Such scenarios can be triggering conditions for automatically starting the VPN application. FIG. 8 is illustrative.

FIG. 8 shows an example UI 800 that was initially in a background 805 position of the client device. The UI 800 is a UI of a MAM-controlled application. The SDK mentioned earlier is able to communicate with the client device's OS to determine when the UI 800 will transition from the background 805 to the foreground 810. In some cases, the SDK is able to determine a time period 815 for when the UI 800 will transition based on communications with the OS. In this regard, the SDK can determine whether the UI 800 is currently transitioning to the foreground 810 and/or can determine an upcoming time period as to when the UI 800 will subsequently transition. The SDK can also determine whether the UI 800 has already transitioned to the foreground 810.

Either before, during, or within a determined time period after the UI 800 has transitioned to the foreground 810, the SDK is able to implement the policy that, when implemented, results in the VPN application automatically being activated or launched, as shown by auto-start 820. That is, the SDK can optionally communicate with the OS to trigger the auto-start of the VPN application.

Similarly, when the UI transitions from the foreground 825 to the background 830, the SDK can detect such a transition (e.g., via communications with the OS) to then automatically stop or terminate the VPN tunnel and/or the VPN application, as shown by the auto-stop 835. Further details on these features will now be discussed in connection with the flowcharts of FIGS. 9 and 10.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
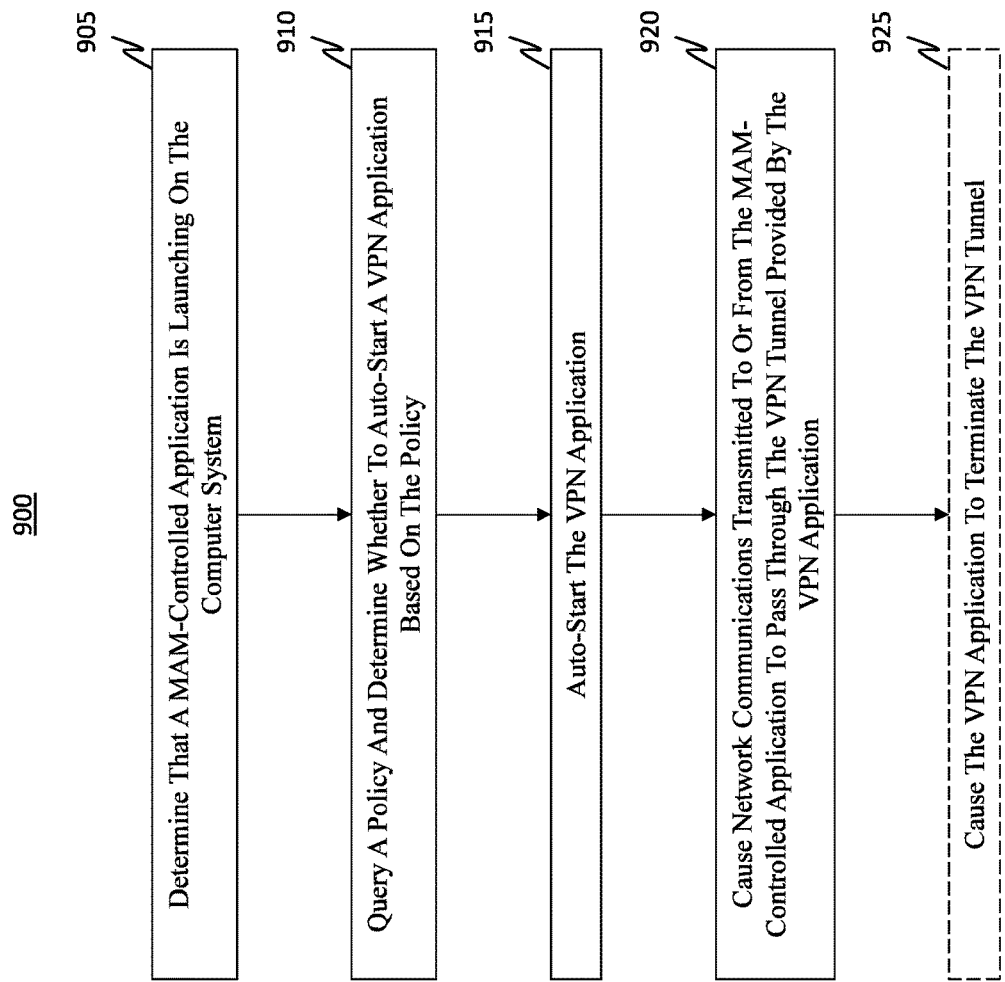
FIG. 9 illustrates a flowchart of an example method for auto-starting a VPN application in a MAM environment.

FIG. 9 illustrates a flowchart of an example method 900 for auto-starting a virtual private network (VPN) in a mobile application management (MAM) environment that is operating on a client device. For instance, method 900 can be implemented using the client device 600 of FIG. 6 or the client device 700 of FIG. 7. Similarly, the method 900 can be implemented in the BYOD architecture 100 of FIG. 1. At least some of the disclosed operations can be performed by the SDK mentioned earlier, which can be implemented via a computer processor. Furthermore, at a higher level, the disclosed operations can be performed by the computer processor. For instance, the processor can perform the operations of the SDK, the operations of the OS, and the operations of the VPN application, among others. Details on processors will be provided later in connection with FIG. 11.

Initially, there is an act (act 905) of determining that a MAM-controlled application is launching on the client device. The term "launch" should be interpreted broadly and can include an initial startup of the MAM-controlled application or perhaps even a scenario where the MAM-controlled application is resuming and the application's UI is being brought to a foreground of the device.

The process of determining that the MAM-controlled application is launching can be performed by the SDKs mentioned earlier. In particular, the SDK can be triggered when the MAM-controlled application is launching. Similarly, the SDK can communicate with the OS to determine additional information about the MAM-controlled application, such as perhaps when a UI of the MAM-controlled application is to transition from a background to a foreground.

After determining that the MAM-controlled application is launching, act 910 involves querying a policy and determining whether to auto-start a VPN application based on the policy. As an example, the SDK 620 of FIG. 6 can query the policy 635, which is stored or cached locally on the client device, and/or can query the policy 650A, which is stored remotely. The policy is enterprise policy and can delineate whether or not a VPN should be used when the MAM-controlled application is in use. The SDK (or library) can interpret the policy and then apply it, such as by facilitating the automatic triggering or auto-starting of the VPN application, which can then initiate a VPN tunnel (i.e. the VPN application is configured to initiate the VPN tunnel). When the policy is stored remotely, the process of querying the policy can optionally trigger a download of the policy locally to the client device from a remote server.

Based on the policy indicating that the VPN application is to be auto-started after or concurrently with a launch (including a scenario where a UI is brought to a foreground) of the MAM-controlled application, act 915 includes automatically triggering or auto-starting the VPN application, which initiates a VPN tunnel that is usable by at least the MAM-controlled application. For instance, the policy 635, 650A from FIG. 6 can indicate that a VPN should be used when a UI of the MAM-controlled app 610 is brought to a foreground.

In some cases, the VPN application initiates the VPN tunnel after a determination is made that a UI of the MAM-controlled application will subsequently be brought to a foreground of the client device. For instance, by communicating with the OS (or perhaps intercepting communications from the OS), the SDK can determine when the UI will subsequently be brought to the foreground. As an example, a communication can be intercepted or received, where the communication indicates that within a designated time period (e.g., perhaps 1 millisecond (ms), 2 ms, 3 ms, 4 ms, 5 ms, etc.) the UI will be surfaced and brought to the foreground. Based on this communication, the SDK can then trigger the launch or auto-start of the VPN application.

In this sense, a library integrated within the MAM-controlled application (e.g., the SDK) identifies when a user interface (UI) of the MAM-controlled application will subsequently be brought to a foreground of the client device. Furthermore, the library can submit a message to query the policy in order to determine whether the VPN application is to be auto-started.

In some cases, the VPN application initiates the VPN tunnel after the MAM-controlled application launches and before the UI of the MAM-controlled application is brought to the foreground. In some cases, the VPN application initiates the VPN tunnel within a specified timeframe after the UI has been brought to the foreground. For example, the specified time frame may be 1 millisecond (ms), 2 ms, 3 ms, 4 ms, 5 ms, and so on.

Act 920 then involves causing network communications transmitted to or from the MAM-controlled application to pass through the VPN tunnel provided by the VPN application, which was automatically triggered or auto-started based on the policy associated with the MAM-controlled application. To illustrate, after the VPN tunnel 665 of FIG. 6 has been initiated by the VPN application 655, the network communications 670 can be transmitted through the VPN tunnel 665. The VPN tunnel provided by the VPN application can be configured to host multiple network communications from multiple different applications (e.g., multiple different MAM-controlled apps) executing on the client device.

Optionally (as indicated by the dashed border), act 925 can include causing the VPN application to terminate the VPN tunnel at some point in time after the VPN application was auto-started. This termination can occur (i) as a result of a determination that the MAM-controlled application has been closed or has ceased operating or perhaps is in the process of being closed, (ii) as a result of a determination that the UI is transitioning (or has transitioned) from a foreground to a background, or (iii) as a result of some other condition being satisfied. An example of another condition can be a scenario where the user has locked his/her device or where the device has been put to sleep.

Figure 10:
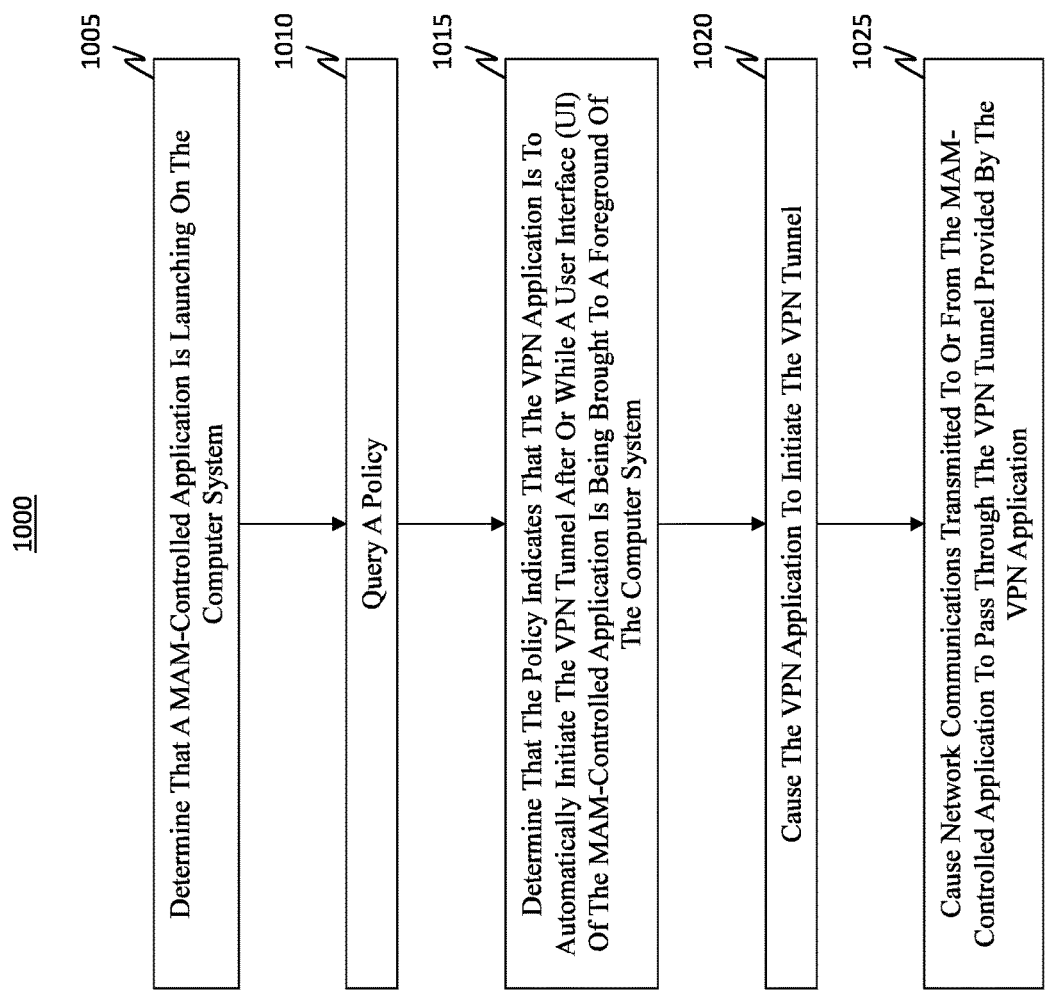
FIG. 10 illustrates another flowchart of an example method for auto-starting a VPN in a MAM environment.

FIG. 10 shows another flowchart of an example method 1000 that can also be performed by the disclosed SDK. Specifically, method 1000 recites various operations for auto-starting a virtual private network (VPN) in a mobile application management (MAM) environment that is operating on a computer system, such as the disclosed client devices.

Act 1005 includes determining that a MAM-controlled application is launching on the computer system. As stated before, such operations can be performed by the SDK interacting with the device's OS to determine how the MAM-controlled application is launching. Launching includes a scenario where a UI of the MAM-controlled application is being brought to a foreground.

After determining that the MAM-controlled application is launching, act 1010 includes querying a policy. Act 1015 then includes determining that the policy indicates that the VPN application is to automatically initiate the VPN tunnel after or while a user interface (UI) of the MAM-controlled application is being brought to a foreground of the computer system. The policy is controlled by the enterprise, and the SDK can implement that policy on the client device.

In response to an indication that the UI of the MAM-controlled application will subsequently be brought to the foreground, act 1020 includes causing the VPN application to initiate the VPN tunnel, which is usable by at least the MAM-controlled application. In some embodiments, the indication can indicate that the UI of the MAM-controlled application is to be brought to the foreground. Furthermore, this indication can be provided by an operating system of the computer system.

Additionally, act 1025 includes causing network communications transmitted to or from the MAM-controlled application to pass through the VPN tunnel provided by the VPN application. Accordingly, the disclosed embodiments bring about numerous and substantial benefits, particularly as a result of being able to automatically start a VPN application in a MAM environment.

Example Computer/Computer Systems

Figure 11:
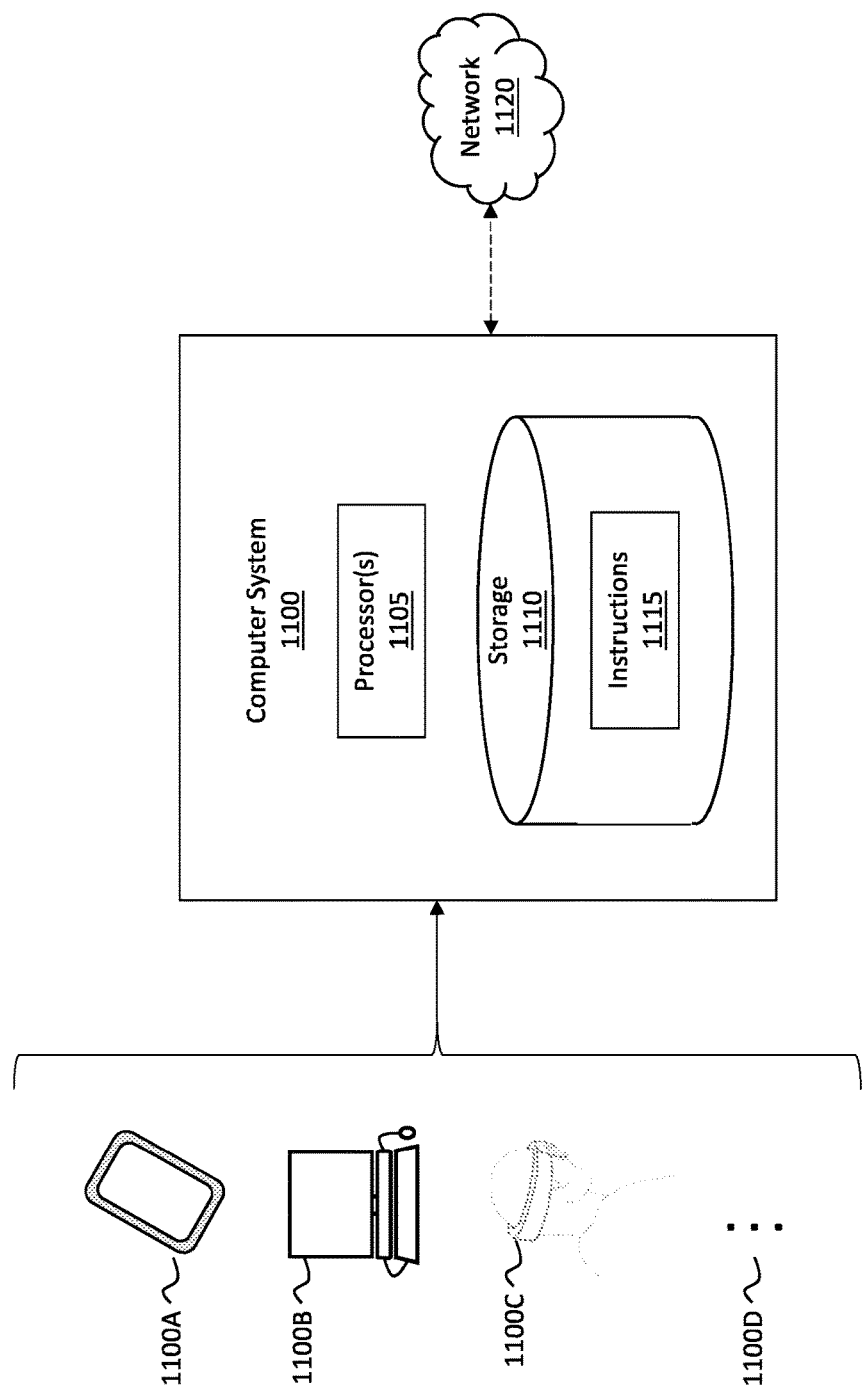
FIG. 11 illustrates an example of a computer system configured to perform any of the disclosed operations.

Attention will now be directed to FIG. 11 which illustrates an example computer system 1100 that may include and/or be used to perform any of the operations described herein. Computer system 1100 may take various different forms. For example, computer system 1100 may be embodied as a tablet 1100A, a desktop or a laptop 1100B, a wearable device 1100C, a mobile device, or a standalone device. The ellipsis 1100D indicates that the computer system 1100 can take on any other form as well. Computer system 1100 may also be a distributed system that includes one or more connected computing components/devices that are in communication with computer system 1100.

In its most basic configuration, computer system 1100 includes various different components. FIG. 11 shows that computer system 1100 includes one or more processor(s) 1105 (aka a "hardware processing unit") and storage 1110.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "engine," or even "SDK" can refer to hardware processing units or to software objects, routines, or methods that may be executed on computer system 1100. The different components, modules, engines, and services described herein may be implemented as objects or processors that execute on computer system 1100 (e.g. as separate threads).

Storage 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1110 is shown as including executable instructions 1115. The executable instructions 1115 represent instructions that are executable by the processor(s) 1105 of computer system 1100 to perform the disclosed operations, such as those described in the various methods.

The disclosed embodiments may comprise or utilize a special-purpose or general-purpose computer including computer hardware, such as, for example, one or more processors (such as processor(s) 1105) and system memory (such as storage 1110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks to remote/separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

In view of the foregoing, the present invention may be embodied in multiple different configurations, as outlined above, and as exemplified by the following aspects.

1. A method for auto-starting a virtual private network (VPN) in a mobile application management (MAM) environment that is operating on a client device, said method comprising:
   determining that a MAM-controlled application is launching on the client device;
   after determining that the MAM-controlled application is launching, querying a policy and determining whether to auto-start a VPN application based on the policy;
   based on the policy indicating that the VPN application is to be auto-started after or concurrently with a launch of the MAM-controlled application, auto-starting the VPN application, which is configured to initiate a VPN tunnel that is usable by at least the MAM-controlled application; and causing network communications transmitted to or from the MAM-controlled application to pass through the VPN tunnel.

2. The method according to preceding Aspect 1, wherein the VPN application initiates the VPN tunnel after a determination that a user interface (UI) of the MAM-controlled application will subsequently be brought to a foreground of the client device.

3. The method according to preceding Aspects 1 to 2, wherein the VPN application initiates the VPN tunnel after the MAM-controlled application launches and before a user interface (UI) of the MAM-controlled application is brought to a foreground of the client device.

4. The method according to preceding Aspects 1 to 3, wherein a library integrated within the MAM-controlled application identifies when a user interface (UI) of the MAM-controlled application will subsequently be brought to a foreground of the client device, and wherein the library submits a message to query the policy.

5. The method according to preceding Aspects 1 to 4, wherein the policy is cached locally on the client device.

6. The method according to preceding Aspects 1 to 5, wherein querying the policy triggers a download of the policy locally to the client device from a remote server.

7. The method according to preceding Aspects 1 to 6, wherein a library integrated with the MAM-controlled application communicates with an operating system of the client device, wherein the library determines, based on communications with the operating system, when a user interface (UI) of the MAM-controlled application will subsequently be brought to a foreground of the client device, and wherein the library triggers the VPN application to initiate the VPN tunnel in response to a determination that the UI will subsequently be brought to the foreground within a determined time period.

8. The method according to preceding Aspects 1 to 7, wherein the VPN tunnel provided by the VPN application is configured to host multiple network communications from multiple different applications executing on the client device.

9. The method according to preceding Aspects 1 to 8, wherein the MAM environment operates to restrict the MAM-controlled application but refrains from restricting a second application installed on the client device.

10. The method according to preceding Aspects 1 to 9, wherein the method further includes causing the VPN application to terminate the VPN tunnel.

11. A computer system configured to auto-start a virtual private network (VPN) in a mobile application management (MAM) environment that is operating on the computer system, said computer system comprising:
   a processor; and
   a computer-readable hardware storage device that stores instructions that are executable by the processor to cause the computer system to at least:
      determine that a MAM-controlled application is launching on the computer system;
      after determining that the MAM-controlled application is launching, query a policy and determine whether to auto-start a VPN application based on the policy;
      based on the policy indicating that the VPN application is to be auto-started after or concurrently with a launch of the MAM-controlled application, auto-start the VPN application, which is configured to initiate a VPN tunnel that is usable by at least the MAM-controlled application;
      cause network communications transmitted to or from the MAM-controlled application to pass through the VPN tunnel; and
      cause the VPN application to terminate the VPN tunnel.

12. The computer system according to preceding Aspect 11, wherein the VPN application terminates the VPN tunnel in response to a determination that the MAM-controlled application has ceased operating.

13. The computer system according to preceding Aspects 11 to 12, wherein the VPN application terminates the VPN tunnel in response to a determination that a user interface (UI) of the MAM-controlled application has transitioned from a foreground of the computer system to a background of the computer system.

14. The computer system according to preceding Aspects 11 to 13, wherein the VPN application terminates the VPN tunnel in response to a determination that the MAM-controlled application has been closed.

15. The computer system according to preceding Aspects 11 to 14, wherein the MAM-controlled application includes a MAM component that limits operations of the MAM-controlled application.

16. The computer system according to preceding Aspects 11 to 15, wherein the computer system includes a MAM component that limits operations of the MAM-controlled application.

17. The computer system according to preceding Aspects 11 to 16, wherein the VPN application initiates the VPN tunnel independently of logic that is executed to operate the MAM-controlled application.

18. The computer system according to preceding Aspects 11 to 17, wherein automatically triggering the VPN application, which then initiates the VPN tunnel, is performed using a standard platform-provided inter-process communication (IPC).

19. A computer system configured to auto-start a virtual private network (VPN) in a mobile application management (MAM) environment that is operating on the computer system, said computer system comprising:
   a processor; and
   a computer-readable hardware storage device that stores instructions that are executable by the processor to cause the computer system to at least:
      determine that a MAM-controlled application is launching on the computer system;
      after determining that the MAM-controlled application is launching, query a policy;
      determine that the policy indicates that the VPN application is to automatically initiate a VPN tunnel after or while a user interface (UI) of the MAM-controlled application is being brought to a foreground of the computer system;
      in response to an indication that the UI of the MAM-controlled application will subsequently be brought to the foreground, cause the VPN application to initiate the VPN tunnel, which is usable by at least the MAM-controlled application; and
      cause network communications transmitted to or from the MAM-controlled application to pass through the VPN tunnel provided by the VPN application.

20. The computer system according to preceding Aspect 19, wherein the indication, which indicates that the UI of the MAM-controlled application is to be brought to the foreground, is provided by an operating system of the computer system.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for auto-starting a virtual private network (VPN) in a mobile application management (MAM) environment that is operating on a client device, said method comprising:
   determining that a MAM-controlled application is launching on the client device;
   after determining that the MAM-controlled application is launching, querying a policy and determining whether to auto-start a VPN application based on the policy, wherein the VPN application is configured to enable multiple MAM-controlled applications, including said MAM-controlled application, to use a same VPN tunnel;
   based on the policy indicating that the VPN application is to be auto-started after or concurrently with a launch of the MAM-controlled application, auto-starting the VPN application, which is configured to initiate the VPN tunnel that is usable by at least the MAM-controlled application and that is usable by said multiple MAM-controlled applications; and
   causing network communications transmitted to or from the MAM-controlled application to pass through the VPN tunnel.

2. The method of claim 1, wherein the VPN application initiates the VPN tunnel after a determination that a user interface (UI) of the MAM-controlled application will subsequently be brought to a foreground of the client device.

3. The method of claim 1, wherein the VPN application initiates the VPN tunnel after the MAM-controlled application launches and before a user interface (UI) of the MAM-controlled application is brought to a foreground of the client device.

4. The method of claim 1, wherein a library integrated within the MAM-controlled application identifies when a user interface (UI) of the MAM-controlled application will subsequently be brought to a foreground of the client device, and wherein the library submits a message to query the policy.

5. The method of claim 1, wherein the policy is cached locally on the client device.

6. The method of claim 1, wherein querying the policy triggers a download of the policy locally to the client device from a remote server.

7. The method of claim 1, wherein a library integrated with the MAM-controlled application communicates with an operating system of the client device,
wherein the library determines, based on communications with the operating system, when a user interface (UI) of the MAM-controlled application will subsequently be brought to a foreground of the client device, and
wherein the library triggers the VPN application to initiate the VPN tunnel in response to a determination that the UI will subsequently be brought to the foreground within a determined time period.

8. The method of claim 1, wherein the VPN tunnel provided by the VPN application is configured to host multiple network communications from multiple different applications executing on the client device.

9. The method of claim 1, wherein the MAM environment operates to restrict the MAM-controlled application but refrains from restricting a second application installed on the client device.

10. The method of claim 1, wherein the method further includes causing the VPN application to terminate the VPN tunnel.

11. A computer system configured to auto-start a virtual private network (VPN) in a mobile application management (MAM) environment that is operating on the computer system, said computer system comprising:
a processor; and
a computer-readable hardware storage device that stores instructions that are executable by the processor to cause the computer system to at least:
determine that a MAM-controlled application is launching on the computer system;
after determining that the MAM-controlled application is launching, query a policy and determine whether to auto-start a VPN application based on the policy, wherein the VPN application is configured to enable multiple MAM-controlled applications, including said MAM-controlled application, to use a same VPN tunnel;
based on the policy indicating that the VPN application is to be auto-started after or concurrently with a launch of the MAM-controlled application, auto-starting the VPN application, which is configured to initiate the VPN tunnel that is usable by at least the MAM-controlled application and that is usable by said multiple MAM-controlled applications;
cause network communications transmitted to or from the MAM-controlled application to pass through the VPN tunnel; and
cause the VPN application to terminate the VPN tunnel.

12. The computer system of claim 11, wherein the VPN application terminates the VPN tunnel in response to a determination that the MAM-controlled application has ceased operating.

13. The computer system of claim 11, wherein the VPN application terminates the VPN tunnel in response to a determination that a user interface (UI) of the MAM-controlled application has transitioned from a foreground of the computer system to a background of the computer system.

14. The computer system of claim 11, wherein the VPN application terminates the VPN tunnel in response to a determination that the MAM-controlled application has been closed.

15. The computer system of claim 11, wherein the MAM-controlled application includes a MAM component that limits operations of the MAM-controlled application.

16. The computer system of claim 11, wherein the computer system includes a MAM component that limits operations of the MAM-controlled application.

17. The computer system of claim 11, wherein the VPN application initiates the VPN tunnel independently of logic that is executed to operate the MAM-controlled application.

18. The computer system of claim 11, wherein auto-starting the VPN application, which then initiates the VPN tunnel, is performed using a standard platform-provided inter-process communication (IPC).

19. A computer system configured to auto-start a virtual private network (VPN) in a mobile application management (MAM) environment that is operating on the computer system, said computer system comprising:
a processor; and
a computer-readable hardware storage device that stores instructions that are executable by the processor to cause the computer system to at least:
determine that a MAM-controlled application is launching on the computer system;
after determining that the MAM-controlled application is launching, query a policy;
determine that the policy indicates that a VPN application is to automatically initiate a VPN tunnel after or while a user interface (UI) of the MAM-controlled application is being brought to a foreground of the computer system, wherein the VPN application is configured to enable multiple MAM-controlled applications, including said MAM-controlled application, to use the same VPN tunnel;
in response to an indication that the UI of the MAM-controlled application will subsequently be brought to the foreground, cause the VPN application to initiate the VPN tunnel, which is usable by at least the MAM-controlled application and which is usable by said multiple MAM-controlled applications; and
cause network communications transmitted to or from the MAM-controlled application to pass through the VPN tunnel provided by the VPN application.

20. The computer system of claim 19, wherein the indication, which indicates that the UI of the MAM-controlled application is to be brought to the foreground, is provided by an operating system of the computer system.

* * * * *